United States Patent
Lerch et al.

(10) Patent No.: US 11,190,507 B2
(45) Date of Patent: Nov. 30, 2021

(54) TRUSTED DEVICE ESTABLISHMENT

(71) Applicant: Apple Inc., Cupertino, CA (US)

(72) Inventors: Matthias Lerch, San Francisco, CA (US); Florian Galdo, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 480 days.

(21) Appl. No.: 16/267,314

(22) Filed: Feb. 4, 2019

(65) Prior Publication Data

US 2020/0106774 A1   Apr. 2, 2020

Related U.S. Application Data

(60) Provisional application No. 62/737,827, filed on Sep. 27, 2018.

(51) Int. Cl.
   *H04L 29/06*    (2006.01)
   *G07C 9/00*     (2020.01)
   *G07C 9/28*     (2020.01)

(52) U.S. Cl.
   CPC ...... *H04L 63/0876* (2013.01); *G07C 9/00309* (2013.01); *G07C 9/28* (2020.01); *H04L 63/0442* (2013.01); *G07C 2009/00388* (2013.01)

(58) Field of Classification Search
   CPC ............. H04L 63/0876; H04L 63/0442; H04L 9/3234; H04L 9/3215; H04L 9/3247; H04L 2209/805; H04L 2209/84; H04L 9/0897; H04L 63/0853; G07C 9/28; G07C 9/00309; G07C 2009/00388; G07C 2009/00865; G07C 2009/00793; H04W 12/069; H04W 4/80

USPC .......................... 340/5.7; 455/41.1; 713/170
See application file for complete search history.

(56) References Cited

U.S. PATENT DOCUMENTS

| | | | | |
|---|---|---|---|---|
| 8,723,641 | B2 * | 5/2014 | Sadighi ............... | H04W 12/082 340/5.61 |
| 8,843,649 | B2 * | 9/2014 | Bailey ............... | H04W 12/0431 709/229 |
| 8,934,841 | B2 * | 1/2015 | Koh ...................... | H04W 12/00 455/41.3 |
| 9,646,150 | B2 * | 5/2017 | Toth ...................... | H04L 9/3231 |
| 9,667,608 | B2 * | 5/2017 | Witherspoon ........ | H04L 63/061 |
| 9,722,794 | B2 * | 8/2017 | Blair ................... | H04L 63/0823 |
| 10,127,378 | B2 * | 11/2018 | Toth ...................... | H04L 63/083 |
| 11,057,195 | B2 * | 7/2021 | Tschache .............. | H04L 9/0844 |

(Continued)

*Primary Examiner* — Nam V Nguyen
(74) *Attorney, Agent, or Firm* — Morgan, Lewis & Bockius LLP

(57) ABSTRACT

A device implementing a trusted device establishment system includes at least one processor configured to receive, via a direct wireless connection and from an other device, a public key associated with the other device and an indication of a data item previously provided to the other device via an out-of-band channel. The at least one processor is further configured to verify that the indication of the data item corresponds to the data item previously provided to the other device, and store, in a secure memory region, the public key in association with an identifier corresponding to the other device when the indication of the data item is verified. The at least one processor is further configured to authorize the public key to access a secure device based at least in part on the public key being stored in the secure memory region.

20 Claims, 8 Drawing Sheets

(56) References Cited

U.S. PATENT DOCUMENTS

| | | | | |
|---|---|---|---|---|
| 2009/0240814 A1* | 9/2009 | Brubacher | ............ | H04W 12/50 |
| | | | | 709/227 |
| 2010/0043056 A1* | 2/2010 | Ganapathy | ........ | H04W 12/0431 |
| | | | | 726/2 |
| 2016/0366124 A1* | 12/2016 | Benoit | ................. | H04L 63/061 |
| 2017/0099151 A1* | 4/2017 | Kim | ......................... | H04L 9/14 |
| 2017/0272251 A1* | 9/2017 | Osheter | ................ | H04L 63/062 |
| 2017/0347266 A1* | 11/2017 | Petel | .................... | H04L 9/3271 |
| 2017/0359342 A1* | 12/2017 | Magyar | ................ | H04L 63/126 |
| 2021/0136065 A1* | 5/2021 | Liokumovich | ......... | H04W 4/70 |

\* cited by examiner

TRUSTED DEVICE ESTABLISHMENT

CROSS REFERENCE TO RELATED APPLICATIONS

This application claims the benefit of priority to U.S. Provisional Patent Application No. 62/737,827 entitled "Trusted Device Establishment" filed Sep. 27, 2018, the disclosure of which is hereby incorporated herein in its entirety.

TECHNICAL FIELD

The present description relates generally to trusted device establishment, including establishing trusted devices for high value sharing.

BACKGROUND

An individual user may own multiple electronic devices, such as a phone, a tablet, a watch, and a computer. If the user has associated each of the devices with their user account, there may be a trust relationship implicitly established between the different devices. Thus, the user may be able to share information across the devices with a relatively high degree of certainty that the information is being shared with a trusted device (e.g., another device associated with the same user account). However, such a trust relationship may not be implicitly established with respect to devices associated with other users' accounts.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

Figure 1:
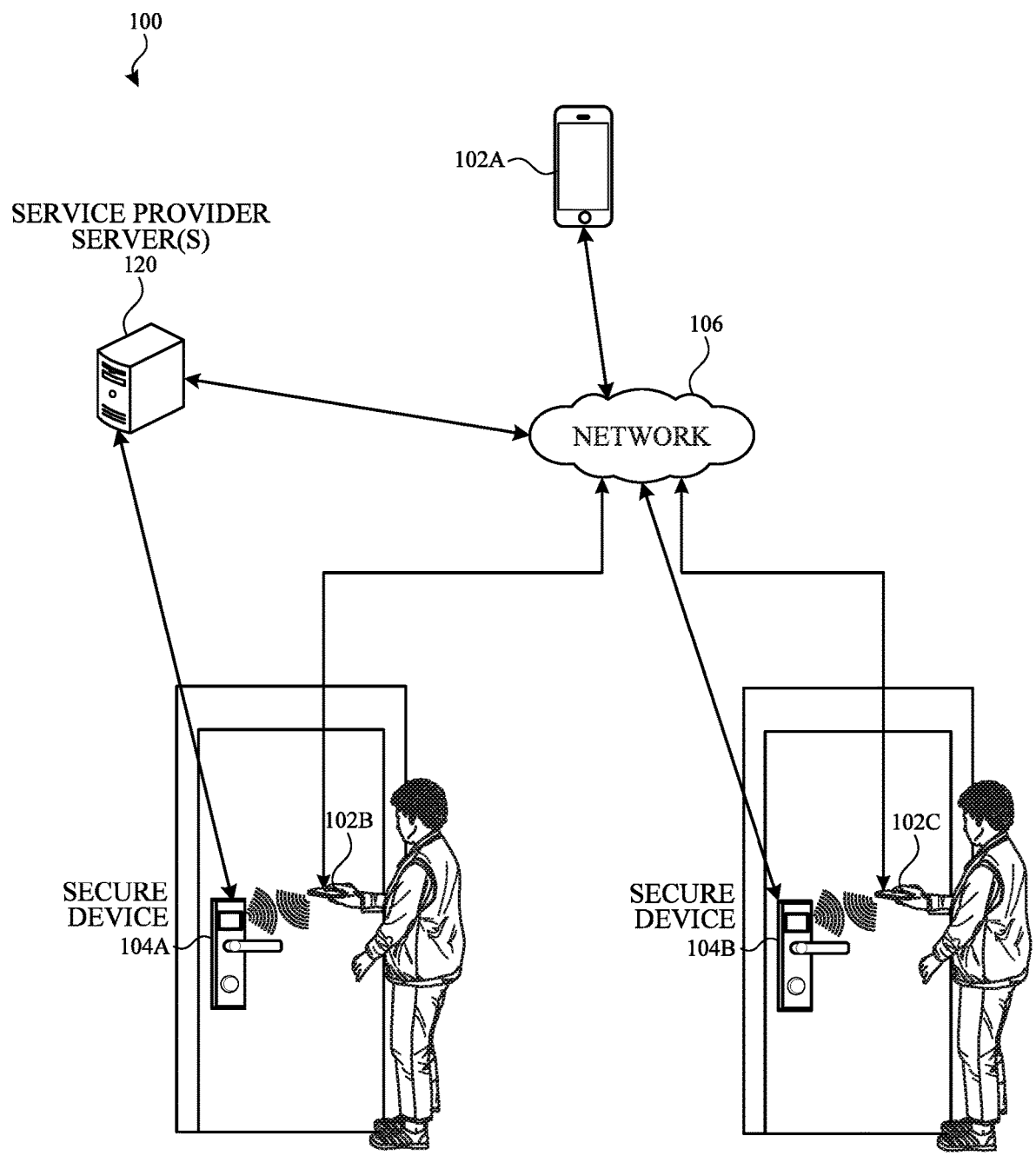
FIG. 1 illustrates an example network environment in which a trusted device establishment system may be implemented in accordance with some implementations.

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, the subject technology is not limited to the specific details set forth herein and can be practiced using one or more implementations. In one or more implementations, structures and components are shown in block diagram form in order to avoid obscuring the concepts of the subject technology.

As smart devices proliferate into homes and vehicles, the use of physical keys for access, e.g., to homes, vehicles, etc., may give way to the use of digital keys stored on electronic devices, such as watches, phones, tablets, etc. For example, a user may open a lock on a door to their house and/or car using their phone (e.g., instead of a physical key). As physical keys move toward obsolescence, so too may the traditional manner of providing/sharing access to a home and/or vehicle with another person, e.g. handing the person a physical key (to a lock) for accessing the home and/or vehicle.

Although digital keys may be shared/transferred between electronic devices of different users, sharing digital keys between electronic devices may lack the implicit trust that is established by the overt act of handing another person a physical key. Thus, the subject system allows devices associated with different user accounts to establish an explicit trust relationship with one another, which may then be used as the basis for performing high value sharing (e.g., sharing of a high value asset) between the devices, e.g. providing a digital key or other such credential allowing another user's device to access a user's property, e.g., house and/or vehicle.

In the subject system, a trust relationship may be initially established between two electronic devices that are located proximate to one another via a direct wireless connection between short range radios of the electronic devices (e.g., near-field communication (NFC) radios, Bluetooth radios, Wi-Fi radios and the like). The short range radios of the electronic devices may be physically and/or logically bound to respective secure elements and/or secure enclave processors of the electronic devices, such that communications of the trust establishment process can physically and/or logically bypass the host processors of the electronic devices. For example, the short range radios may be securely communicatively coupled to the respective secure elements and/or secure enclave processors of the electronic devices. In this manner the respective secure elements and/or secure enclave processors of the electronic devices can directly perform the trust establishment process with one another without the involvement of the host processors, thereby ensuring that a malicious host processor does not intervene in the trust establishment process, while also mitigating the possibility of any other man in the middle attacks.

The establishment of the trust relationship may include the second electronic device transmitting a public key (for which the second electronic device holds the corresponding private key) to the first electronic device via the direct wireless connection. When the second electronic device is verified as being trusted, the first electronic device may store the public key (in association with an identifier of the second electronic device and/or of an associated user) in a secure memory region, such as in a memory of the secure element and/or secure enclave processor. The storage of the public key in the secure memory region may serve as verification that the trust relationship has been established between the first electronic device and the second electronic device.

Accordingly, when the first electronic device receives a request to share access, e.g., to a house, vehicle, or other secure device, with the second electronic device, the first electronic device responsively requests that the second electronic device provide its public key. The first electronic device verifies that the public key provided at the time of sharing is the same as the public key that was provided at the time of establishing the trust relationship (e.g. the public key that is stored in the secure memory region of the first electronic device). If the public key is verified as belonging to a trusted device, the first electronic device signs (e.g. with a private key provided by and/or associated with a secure device) an attestation data item that includes the public key and indicates one or more access rights corresponding to the secure device that have been assigned to the public key of the second electronic device. The first electronic device then provides the attestation data item to the second electronic device and the second electronic device can use the attestation data item to access the secure device in accordance with the one or more access rights assigned to the public key.

FIG. 1 illustrates an example network environment 100 in which a trusted device establishment system may be implemented in accordance with one or more implementations. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

The network environment 100 includes one or more electronic devices 102A-C, one or more secure devices 104A-B, a network 106, and one or more service provider servers 120. The network 106 may communicatively couple, for example, one or more of the secure devices 104A-B to the one or more service provider servers 120 and/or the one or more electronic devices 102A-C, and may communicatively couple one or more of the electronic devices 102A-C to the one or more service provider servers 120 and/or the one more secure devices 104A-B.

One or more of the electronic devices 102A-C may communicate with one or more of the secure devices 104A-B via a direct communication, such as a near field communication (NFC), that bypasses the network 106. In one or more implementations, one or more of the electronic devices 102A-C may communicate with one or more of the secure devices 104A-B over the network 106 and/or one or more of the secure devices 104A-B may not be communicatively coupled to the network 106, such as the secure device 104A in FIG. 1. In one or more implementations, the network 106 may be an interconnected network of devices that may include, or may be communicatively coupled to, the Internet.

The secure devices 104A-B may be, for example, secure devices included in and/or coupled to access devices, such as doors, locks, etc., secure devices included in and/or coupled to automotive/vehicle devices, and/or any devices that include one or more wireless interfaces that may be used to grant one or more access rights, such as NFC radios, wireless local area network (WLAN) radios, Bluetooth radios, Zigbee radios, cellular radios, and/or other wireless radios. In FIG. 1, by way of example, the secure device 104A is depicted as a device included in and/or coupled to an access device, such as a door lock, and the secure device 104B is depicted as a device included in and/or coupled to an access device, such as a door lock. One or more of the secure devices 104A-B may be, and/or may include all or part of, the electronic system discussed below with respect to FIG. 8.

The one or more service provider servers 120 may include one or more servers that facilitate trusted device establishment between two or more of the electronic devices 102A-C and/or that facilitate conveying/sharing access rights to secure devices 104A-B between two or more of the electronic devices 102A-C that have established a trust relationship. For example, the one or more service provider servers 120 may include one or more trusted services manager (TSM) servers, one or more broker servers, one or more application servers, and/or the like.

The one or more service provider servers 120 may also include one or more server devices that may be associated with one or more service providers, such as service providers corresponding to the secure devices 104A-B, and/or corresponding to respective manufacturers of the secure devices 104A-B. For example, the one or more service provider servers 120 may include one or more key tracking servers that are configured to store records of digital keys for accessing one or more of the secure devices 104A-B that are provided to the electronic devices 102A-C and/or that are shared by the electronic devices 102A-C. In one or more implementations, the one or more service provider servers 120 may be communicatively coupled to one or more of the secure devices 104A-B via a direct and/or proprietary communication link, such as a telematics communication link that bypasses all or part of the network 106.

In one or more implementations, authorized users of the electronic devices 102A-C may have respective user accounts with one or more of the service providers corresponding to the one or more service provider servers 120. The user accounts may be used to establish and/or manage trusted devices as well as access rights conveyed to trusted devices. The one or more service provider servers 120 may be, and/or may include all or part of, the electronic system discussed below with respect to FIG. 8.

The electronic devices 102A-C may be, for example, portable computing devices such as laptop computers, smartphones, peripheral devices (e.g., digital cameras, headphones), tablet devices, wearable devices (e.g., watches, bands, etc.), or other appropriate devices that include one or more wireless interfaces, such as one or more NFC radios, WLAN radios, Bluetooth radios, Zigbee radios, cellular radios, and/or other wireless radios. In FIG. 1, by way of example, the electronic devices 102A-C are depicted as mobile devices. One or more of the electronic devices 102A-C may be, and/or may include all or part of, the electronic device discussed below with respect to FIGS. 2 and 3, and/or the electronic system discussed below with respect to FIG. 8.

In one or more implementations, one or more of the electronic devices 102A-C, such as the electronic device 102A, may be paired with and/or associated with one or more of the secure devices 104A-B. For example, the owner of the secure devices 104A-B may pair their electronic device, e.g. the electronic device 102A, with the secure devices 104A-B. The pairing process may include the secure devices 104A-B (and/or one or more of the service provider servers 120) providing one or more private keys to the electronic device 102A that can be used by the electronic device 102A to sign access commands provided to the secure devices 104A-B. In this manner, the secure devices 104A-B can confirm that the access commands were issued by the electronic device 102A.

In the subject system, the electronic device 102A can also use the private keys provided by the secure devices 104A-B (and/or one or more of the service provider servers 120) to share one or more access rights (with respect to the secure devices 104A-B) with one or more of the electronic devices 102B-C. Since sharing the one or more access rights with the electronic devices 102B-C will grant the users of the electronic devices 102B-C access to the secure devices 104A-B (e.g., the user's car or house), the electronic device 102A may not share the one or more access rights with one or more of the electronic devices 102B-C unless a trusted device relationship has been established between the electronic device 102A and one or more of the electronic devices 102B-C. An example data flow of establishing a trusted device relationship and sharing one or more access rights is discussed further below with respect to FIG. 4, an example process of establishing a trusted device relationship is discussed further below with respect to FIG. 5, and an example process of sharing one or more access rights is discussed further below with respect to FIG. 6.

Once the one or more access rights for a secure device 104A have been shared by the electronic device 102A with one or more of the electronic devices 102B-C, such as the electronic device 102B, the electronic device 102B may access the secure device 104A in accordance with the one or more access rights. An example process of receiving one or more access rights for a given secure device 104A and accessing the secure device 104A, are discussed further below with respect to FIG. 7.

Accordingly, the subject system allows the electronic devices 102A-C to establish highly trusted relationships (e.g. when in close proximity), and then leverage the highly trusted relationships to securely share access rights to one or more secure devices 104A-C, which may provide, for example, access to a user's home, vehicle, storage locker, and the like.

Figure 2:
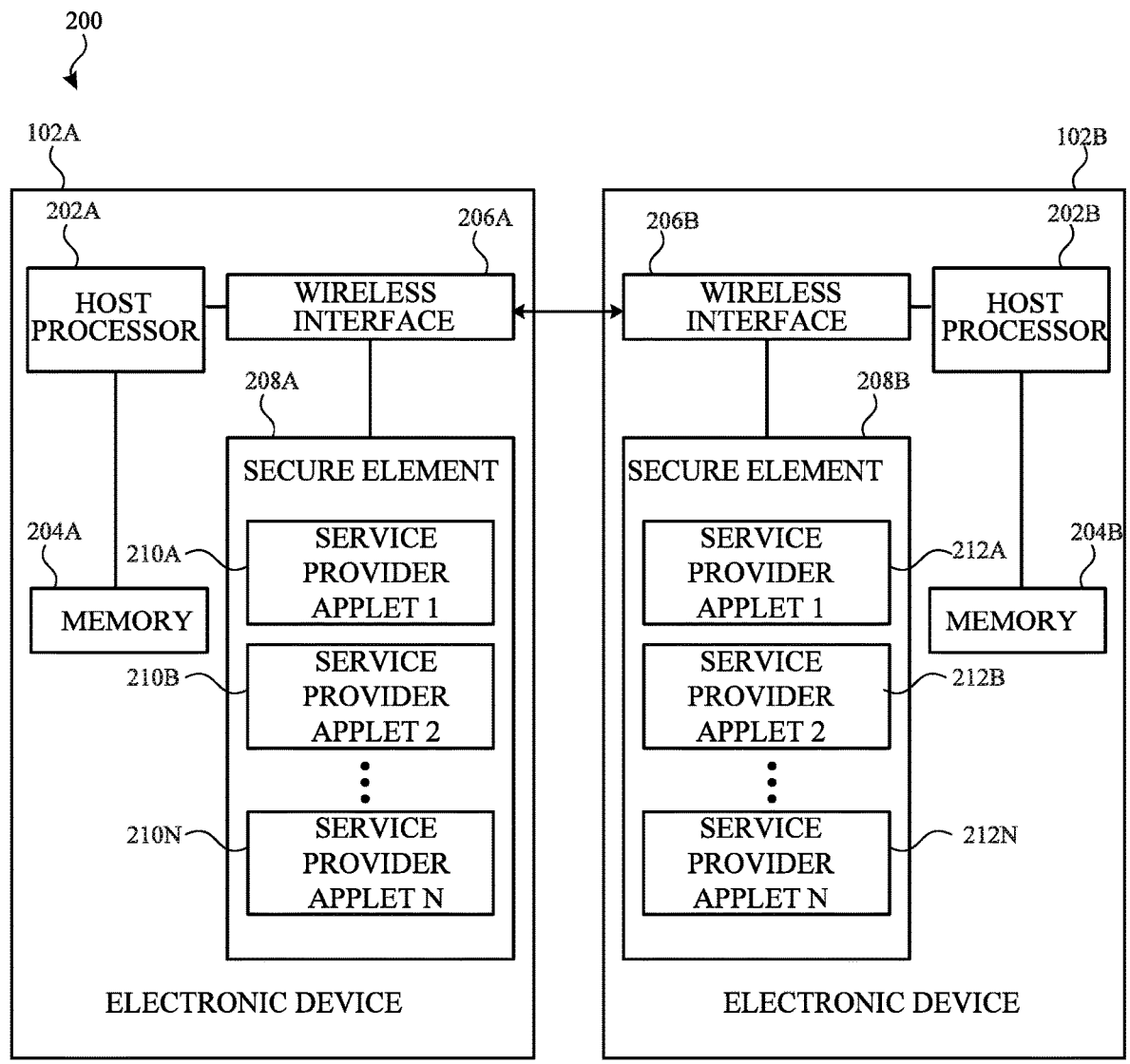
FIG. 2 illustrates an example local area network environment including example electronic devices that may be used in a trusted device establishment system in accordance with some implementations.

FIG. 2 illustrates an example local area network environment 200 including example electronic devices 102A-B that may be used in a trusted device establishment system in accordance with one or more implementations. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided. In one or more implementations, one or more components of the example electronic devices 102A-B may be implemented by one or more of the electronic device 102C and/or the secure devices 104A-B.

The example network environment 200 may include the electronic devices 102A-B. The electronic device 102A may include a host processor 202A, a memory 204A, a wireless interface 206A, and a secure element 208A. The electronic device 102B may include a host processor 202B, a memory 204B, a wireless interface 206B, and a secure element 208B. For explanatory purposes, the electronic devices 102A-B are depicted as including secure elements 208A-B; however, one or more of the electronic devices 102A-B, such as the electronic device 102A, may include a secure enclave processor in lieu of, or in addition to, the secure element 208A.

The secure elements 208A-B may include one or more interfaces for communicatively coupling (directly or indirectly) to the wireless interfaces 206A-B and/or the host processors 202A-B, such as via one or more single wire protocol (SWP) connections and/or any other data connection. The secure element 208A may include one or more service provider applets 210A-N, and the secure element 208B may include one or more service provider applets 212A-N, which may be referred to herein as applets 210A-N, 212A-N. In one or more implementations, the operating system and/or execution environment of the secure elements 208A-B may be a JAVA-based operating system and/or JAVA-based execution environment, and the applets 210A-N, 212A-N may be JAVA-based applets. In other implementations, other operating systems, languages, and/or environments can be implemented. In addition to the one or more applets 210A-N, 212A-N, the secure elements 208A-B may also include one or more additional applets for performing other operations, such as a security applet, a registry applet, and the like.

The applets 210A-N, 212A-N may be provisioned on the secure elements 208A-B in part by one or more of the service provider servers 120, such as a trusted services manager server and/or a broker server. For example, the trusted services manager server and/or the broker server may transmit a provisioning script to the electronic device 102A via the network 106. In some implementations, the host processor 202A of the electronic device 102A may receive the script and may provide the script to the secure element 208A, such as via the wireless interface 206A and/or directly to the secure element 208A. The secure element 208A may perform one or more security mechanisms to verify the received script, such as one or more security mechanisms inherent in the GlobalPlatform framework, and may then execute the received script. The execution of the script by the secure element 208A may cause one or more of the applets 210A-N to be provisioned on the secure element 208A.

In one or more implementations, one or more of the applets 210A-N, 212A-N may correspond to a service provider associated with one or more of the secure devices 104A-B. For example, the applets 210A, 212A may correspond to a service provider associated with the secure device 104A, such as a manufacturer of the vehicle. In this instance, the private keys, public keys, and/or attestation data items associated with the secure device 104A may be stored on the secure elements 208A-B in conjunction with the applets 210A, 212A.

The wireless interfaces 206A-B may include one or more antennas and one or more transceivers for transmitting/receiving wireless communications. The wireless interfaces 206A-B may further include one or more interfaces, such as a single wire protocol interface, for coupling to the host processors 202A-B and/or the secure elements 208A-B. The wireless interfaces 206A-B may be physically or logically bound to the respective secure elements 208A-B, such that a secure communication pathway can be formed between the secure elements 208A-B that logically and/or physically bypasses the host processors 202A-B.

For example, one or more of the wireless interfaces 206A-B may include a dedicated single wire protocol interface that is directly coupled to the respective secure elements 208A-B, such as by a dedicated wire. In one or more implementations, one or more of the wireless interfaces 206A-B may be logically bound to the respective secure elements 208A-B, such as by providing (or injecting) encryption keys, or other security keys, in the wireless interfaces 206A-B and the secure elements 208A-B at the time of manufacture. The wireless interfaces 206A-B and/or the secure elements 208A-B may utilize the security keys to encrypt communications such that the communications cannot be accessed by the respective host processors 202A-B, thereby logically binding the wireless interfaces 206A-B and the respective secure elements 208A-B.

In one or more implementations, one or more of the wireless interfaces 206A-B may be an NFC controller that is able to communicate via one or more different NFC communication protocols, such as NFC-A (or Type A), NFC-B (or Type B), NFC-F (or Type F or FeliCA), and/or International Organization for Standardization (ISO)/International Electrotechnical Commission (IEC) 15693. The NFC-A protocol may be based on ISO/IEC 14443A and, e.g., may use Miller bit coding with a 100 percent amplitude modulation. The NFC-B protocol may be based on ISO/IEC 14443B and, e.g., may use variations of Manchester encoding along with a 10 percent modulation. The NFC-F protocol may be based on FeliCA JIS X6319-4 and, e.g., may use a slightly different variation of Manchester coding than the NFC-B protocol.

One or more of the secure devices 104A-B may include similar wireless communication capabilities as one or more of the electronic devices 102A-B. For example, the secure device 104A may include one or more antennas and/or transceivers for communicating with one or more of the electronic devices 102A-B via one or more of an NFC-A protocol, an NFC-B protocol, an NFC-F protocol, a Bluetooth protocol, a Bluetooth low energy protocol, a Zigbee protocol, a Wi-Fi protocol, or generally any communication protocol. In one or more implementations, one or more of the secure devices 104A-B may include a wireless reader, such as an NFC reader.

The host processors 202A-B may include suitable logic, circuitry, and/or code that enable processing data and/or controlling operations of the electronic devices 102A-B. In this regard, the host processors 202A-B may be enabled to provide control signals to various other components of the electronic devices 102A-B. The host processors 202A-B may also control transfers of data between various portions of the electronic devices 102A-B. Additionally, the host processors 202A-B may enable implementation of an operating system or otherwise execute code to manage operations of the electronic devices 102A-B. The memories 204A-B may include suitable logic, circuitry, and/or code that enable storage of various types of information such as received data, generated data, code, and/or configuration information. The memories 204A-B may include, for example, random access memory (RAM), read-only memory (ROM), flash, and/or magnetic storage.

In one or more implementations, one or more of the host processors 202A-B, the memories 204A-B, the wireless interfaces 206A-B, the secure elements 208A-B, and/or one or more portions thereof, may be implemented in software (e.g., subroutines and code), may be implemented in hardware (e.g., an Application Specific Integrated Circuit (ASIC), a Field Programmable Gate Array (FPGA), a Programmable Logic Device (PLD), a controller, a state machine, gated logic, discrete hardware components, or any other suitable devices) and/or a combination of both.

Figure 3:
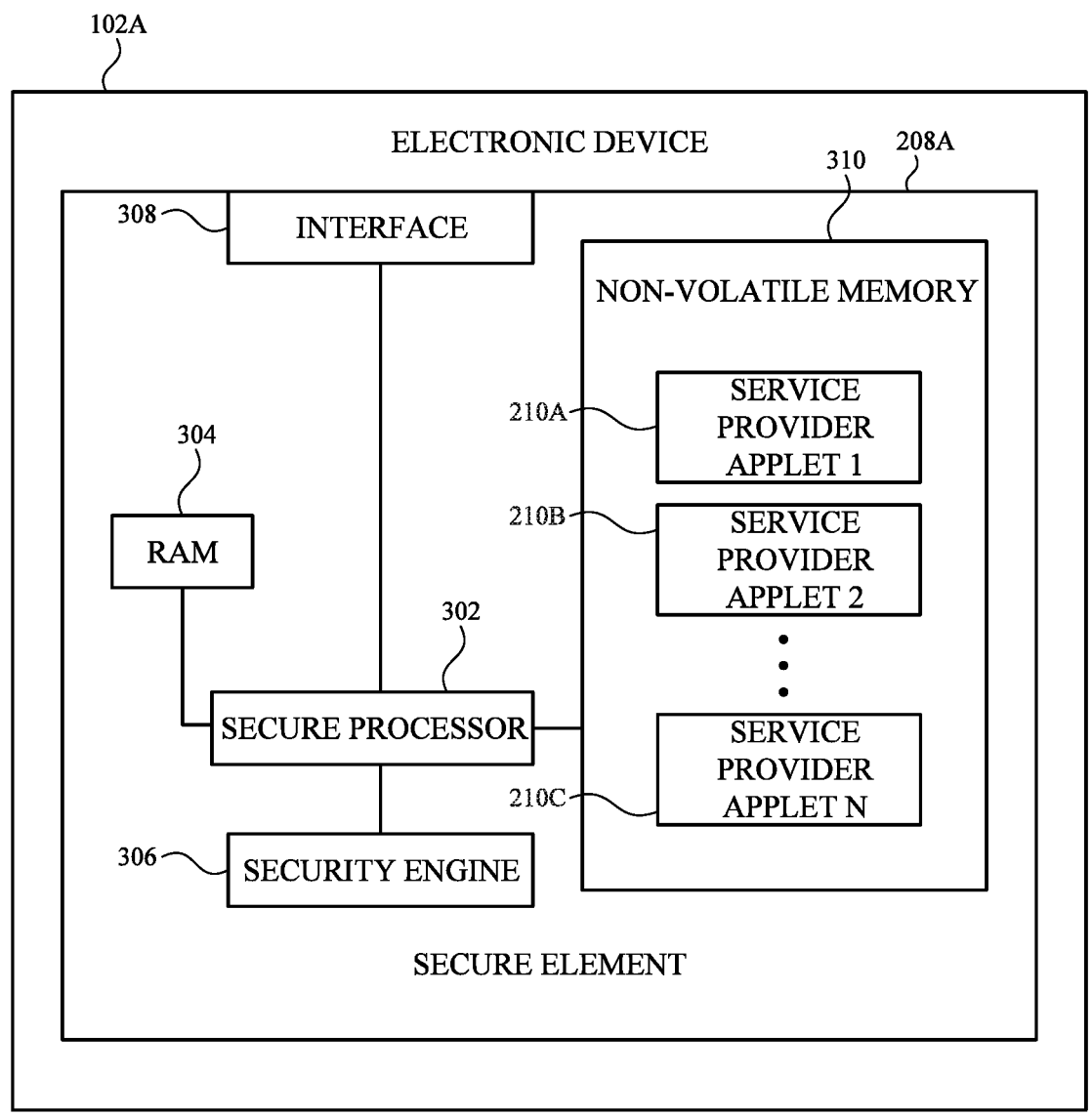
FIG. 3 illustrates an example electronic device including an example secure element that may be used in a trusted device establishment system in accordance with some implementations.

FIG. 3 illustrates an example electronic device 102A including an example secure element 208A that may be used in a trusted device establishment system in accordance with one or more implementations. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided. For explanatory purposes, the secure element 208A is illustrated as being implemented in the electronic device 102A; however, the secure element 208A may be implemented as the secure element 208B of the electronic device 102B and/or any other electronic device.

The secure element 208A may include, among other components, a secure processor 302, RAM 304, a security engine 306, an interface 308, and non-volatile memory 310. The RAM 304 may include one or more of static RAM (SRAM) and/or dynamic RAM (DRAM). The interface 308 may communicatively couple the security element 208A to one or more other chips in the device, such as the wireless interface 206A and/or the host processor 202A. The interface 308 may be, for example, a SWP interface, a universal serial bus (USB) interface, or generally any data interface. The secure processor 302 may be, for example, a reduced instruction set computing (RISC) processor, an advanced RISC machine (ARM) processor, or generally any processing circuitry.

The security engine 306 may perform one or more security operations for the secure element 208A. For example, the security engine 306 may perform cryptographic operations and/or may manage cryptographic keys and/or certificates. In one or more implementations, the communications between the secure element 208A and an external device, such as the secure element 208B of the electronic device 102B may be encrypted. For example, for NFC-F communications, an encryption key may be dynamically generated each time mutual authentication is performed. In these one or more implementations, the encryption/decryption and/or key generation/management may be performed all or in part by the security engine 306.

The non-volatile memory 310 may be and/or may include, for example, flash memory. The non-volatile memory 310 may store the executable code associated with the applets 210A-N, such as private keys, public keys, and/or attestation data items associated with the secure devices 104A-B, and/or for sharing access to the secure devices 104A-B. In one or more implementations, the non-volatile memory 310 may also store firmware and/or operating system executable code that is executed by the secure processor 302 to provide the execution environment for the applets 210A-N, such as a JAVA execution environment. In one or more implementations, the non-volatile memory 310 and/or the RAM 304 may be considered a secure memory region and/or secure domain of the electronic device 102A and/or a secure memory region and/or secure domain of the secure element 208A.

In one or more implementations, one or more of the secure processor 302, the RAM 304, the security engine 306, the interface 308, the non-volatile memory 310, and/or one or more portions thereof, may be implemented in software (e.g., subroutines and code), hardware (e.g., an ASIC, an FPGA, a PLD, a controller, a state machine, gated logic, discrete hardware components, or any other suitable devices) and/or a combination of both.

Figure 4:
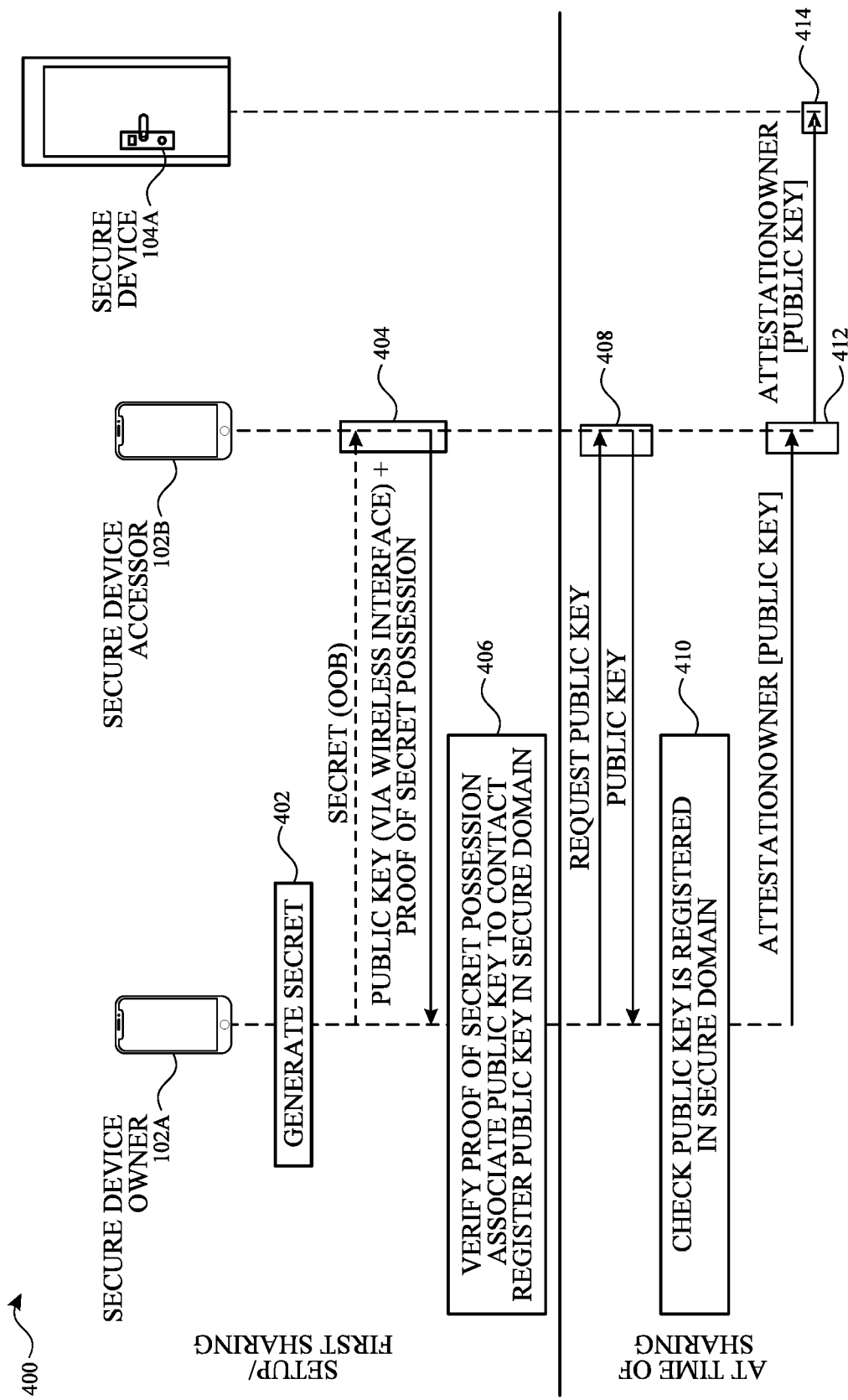
FIG. 4 illustrates an example data flow in a trusted device establishment system in accordance with some implementations.

FIG. 4 illustrates an example data flow 400 in a trusted device establishment system in accordance with one or more implementations. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

The data flow 400 includes the electronic devices 102A-B and the secure device 104A. In the data flow 400, the electronic device 102A is associated with the owner (and/or authorized user) of the secure device 104A. Thus, prior to the data flow 400, the electronic device 102A may have performed a pairing (and/or authorization process) with the secure device 104A. As part of the pairing/authorization, the electronic device 102A and the secure device 104A may have exchanged one or more keys, and/or one or more of the service provider servers 120 may have provided one or more keys to the electronic device 102A and/or the secure device 104A.

For example, a private key may have been provisioned and provided to the electronic device 102A for purposes of signing access commands sent to the secure device 104A and/or for signing conveyances of access rights to other electronic devices, such as the electronic device 102B. In one or more implementations, the electronic device 102A may utilize an existing private key for issuing access commands and/or signing conveyances of access rights, and may provide the corresponding public key to the secure device 104A as part of the pairing/authorization process.

The data flow 400 begins with a trusted device establishment process by which the electronic device 102A can establish the electronic device 102B as a trusted device. Thus, the electronic device 102A generates a secret, e.g. a data item (402), which is provided to the electronic device 102B via a logical or physical out-of-band channel, such as a non-radio frequency channel, or a secured communication channel, such as an end-to-end encrypted communication channel. For example, the secret may be a passcode, or image, that is displayed or otherwise output by the electronic device 102A. The passcode or image may be input into the electronic device 102B, such as by taking a picture of the image and/or by inputting the passcode into the electronic device 102B.

The electronic device 102B, upon receiving the input of the secret via the out-of-band channel, transmits a public key to the electronic device 102A along with proof that the electronic device 102B received the secret (404) via a direct wireless connection between the wireless interface 206B and the wireless interface 206A of the electronic device 102A. For example, the electronic device 102B may transmit the secret itself, and/or an indication of the secret, such as a hash of the secret. Thus, the public key provided by the electronic device 102B may be retrieved from the non-volatile memory 310 of the secure element 208B and transmitted directly (logically and/or physically) to the wireless interface 206B, which transmits the public key directly to the wireless interface 206A of the electronic device 102A via a direct local wireless connection, e.g., NFC, Bluetooth, Wi-Fi, and/or any other short range radio.

In one or more implementations, the wireless interface 206B and/or the secure element 208B of the electronic device 102B may provide an attestation to the electronic device 102A that the wireless interface 206B is logically and/or physically bound to the secure element 208B and that exchanged messages pass through this specific logical and/or physical channel. In one or more implementations, the wireless interface 206A and/or the secure element 208A of the electronic device 102A may provide a similar attestation to the electronic device 102B. In this manner, the electronic devices 102A-B are assured that messages exchanged over the direct local wireless connection will be end-to-end secure between the respective secure elements 208A-B.

In one or more implementations, when the electronic devices 102A-B are within a short communication range of each other, such as within range to perform NFC communication, the electronic devices 102A-B may not utilize the secret (402-404). For example, the electronic device 102A may not provide the secret to the electronic device 102B (402), and the electronic device 102B may transmit the public key to the electronic device (404), e.g. via NFC, without transmitting the secret or proof of receiving the secret (404). However, for relatively longer range communication, such as, for example, Bluetooth or Wi-Fi, the electronic devices 102A-B may utilize the secret (402-404).

The electronic device 102A receives the public key and the proof of the received secret via the logical and/or physical secure channel formed by the wireless interface 206A and the secure element 208A, and verifies that the received proof corresponds to the generated secret. For example, if the electronic device 102B provided the secret itself, the electronic device 102B may compare the secret directly to the generated secret. If the electronic device 102B provided an indication of the secret, such as a hash of the secret, the electronic device 102A may hash the generated secret and compare the hash to the received indication. If the electronic device 102A can verify that the electronic device 102B is in possession of the secret (e.g., via the comparison), the electronic device 102A stores (and/or registers) the public key in a secure domain, such as the non-volatile memory 310 of the secure element 208A and/or another secure memory region of the electronic device 102A, and the electronic device 102A associates the public key with an identifier of the electronic device 102B, such as the user identifier of the user associated with the electronic device 102B (406). An example process of trusted device establishment is discussed further below with respect to FIG. 5.

Once the electronic device 102A establishes the electronic device 102B as a trusted device, e.g., by storing the public key of the electronic device 102B in the secure element 208A in association with the user identifier of the user associated with the electronic device 102B, the electronic device 102A may receive a request to share access rights to the secure device 104A (or any other secure devices associated with the electronic device 102A) with the electronic device 102B. For example, the user of the electronic device 102A may request to share access rights for the secure device 104A with the user of the electronic device 102B. When the request to share access rights is received, the electronic device 102A transmits a request to the electronic device 102B for the public key of the electronic device 102B.

The electronic device 102B receives the request and transmits the public key to the electronic device 102A (408). The electronic device 102A receives the public key and verifies whether the public key is stored in a secure domain of the electronic device 102A in association with the user identifier of the user of the electronic device 102B, such as in the non-volatile memory 310 of the secure element 208A, in order to verify that the electronic device 102B has been established as a trusted device of the electronic device 102A (410).

If the public key is stored in the secure domain in association with the user identifier of the user of the electronic device 102B, the electronic device 102A generates an attestation data item that assigns, to the public key of the electronic device 102B, one or more access rights with respect to the secure device 104A. The one or more access rights may include, for example, unlocking a door or vehicle, driving a vehicle, accessing a locker, or generally any access right that may be provided with respect to a secure device.

The attestation data item may include the public key of the electronic device 102B and an indication of the access rights being assigned to the public key, and the entire attestation data item may be signed via the private key of the electronic device 102A, e.g. the private key that was provided or established in conjunction with the pairing/authorization process with the secure device 104A. The electronic device 102A may transmit the attestation data item to the electronic device 102B. An example process of conveying access rights to an established trusted device is discussed further below with respect to FIG. 6.

The electronic device 102B may receive the attestation data item (412) and may use the attestation data item to access the secure device 104A (414). For example, the electronic device 102B may transmit the attestation data item to the secure device 104A to access the secure device 104A. An example process of receiving and using access rights conveyed by an established trusted device is discussed further below with respect to FIG. 7.

Figure 5:
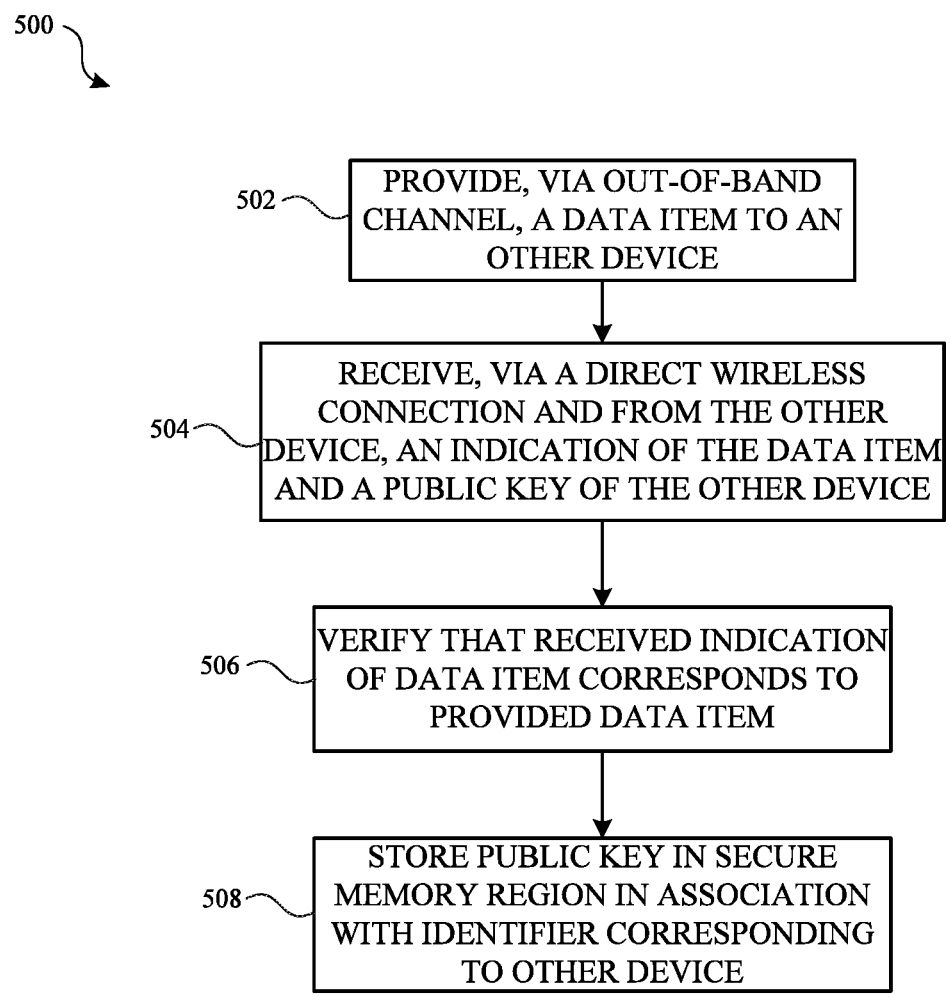
FIG. 5 illustrates a flow diagram of an example process of trusted device establishment in accordance with some implementations.

FIG. 5 illustrates a flow diagram of an example process 500 of trusted device establishment in accordance with one or more implementations. For explanatory purposes, the process 500 is primarily described herein with reference to the electronic device 102A of FIGS. 1-3. However, the electronic device 102A is presented as an exemplary device and the operations described herein may be performed by any suitable device. For example, the process 500 may be performed by one or more of the electronic devices 102B-C, or generally any electronic device. Further for explanatory purposes, the operations of the process 500 are described herein as occurring in serial, or linearly. However, multiple operations of the process 500 may occur in parallel. In addition, the operations of the process 500 need not be performed in the order shown and/or one or more of the operations of the process 500 need not be performed and/or can be replaced by other operations.

The process 500 begins when the electronic device 102A initiates a secure device establishment process with an other device, such as the electronic device 102B, by providing a data item (e.g., a secret) to the other device via an out-of-band channel, such as a non-RF channel (502). The electronic device 102A receives, from the other device via a direct wireless connection formed by the wireless interface 206A and the wireless interface 206B of the other device, an indication of the provided data item (e.g., a hash of the data item or the entire data item) and a public key of the other device (504). The wireless interface 206A may provide the received indication and public key directly to the secure element 208A, bypassing the host processor 202A, such as via a logical and/or physical secure channel (504).

The electronic device 102A verifies that the received indication of the data item corresponds to the data item that was provided to the electronic device 102B via the out-of-band channel (506). If the received indication is verified, thereby proving that the electronic device 102B is in possession of the data item, the electronic device 102A stores the received public key in a secure memory region in association with an identifier corresponding to the other device, such as a user identifier of the user associated with the electronic device 102B (508). For example, the electronic device 102A may store the public key directly in the secure element 208A, such as in the non-volatile memory 310. The storage of the public key of the other device in the secure element 208A of the electronic device 102A may serve as a verification and/or confirmation that the other device has been established as a trusted device of the electronic device 102A.

Figure 6:
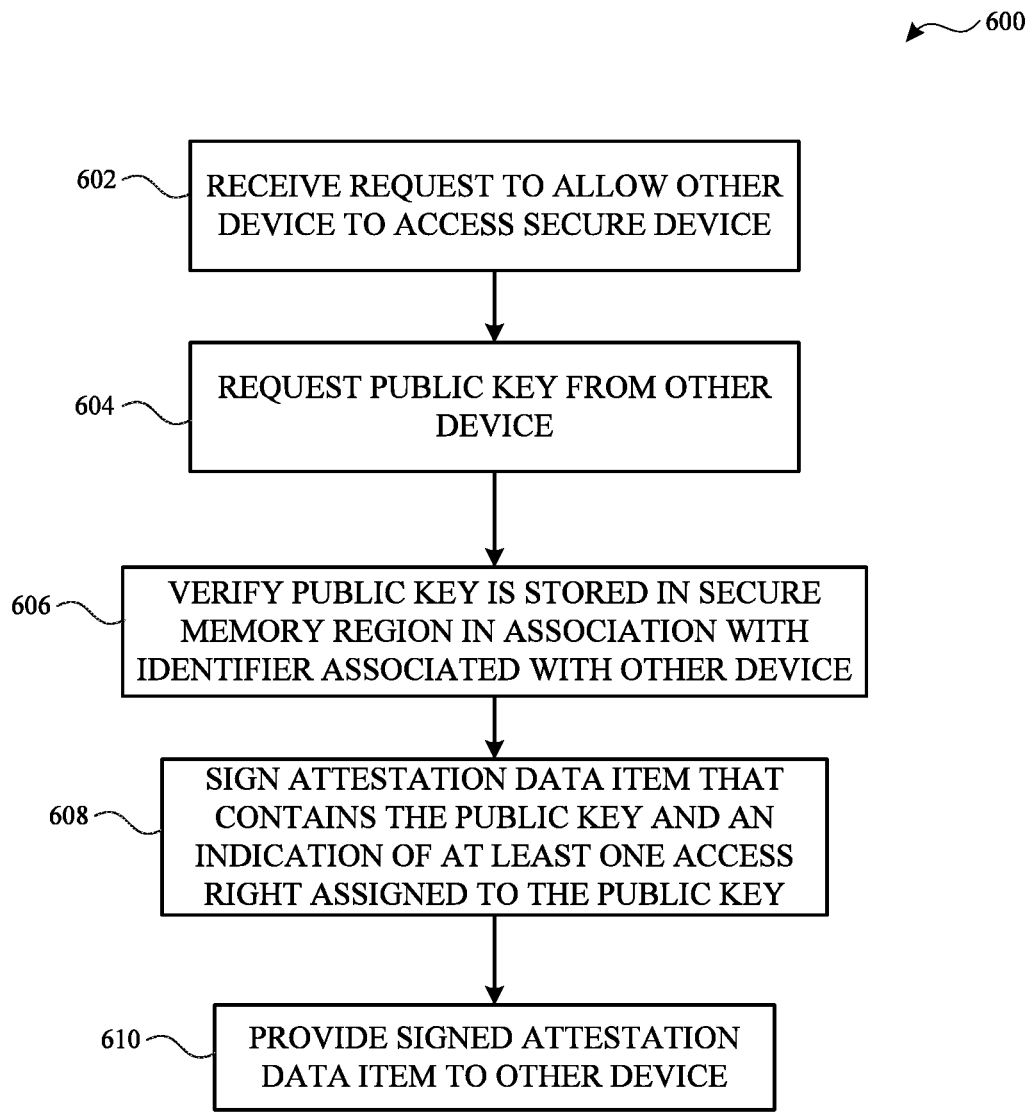
FIG. 6 illustrates a flow diagram of an example process of conveying access rights to an established trusted device in accordance with some implementations.

FIG. 6 illustrates a flow diagram of an example process 600 of conveying access rights to an established trusted device in accordance with one or more implementations. For explanatory purposes, the process 600 is primarily described herein with reference to the electronic device 102A of FIGS. 1-3. However, the electronic device 102A is presented as an exemplary device and the operations described herein may be performed by any suitable device. For example, the process 600 may be performed by one or more of the electronic devices 102B-C, or generally any electronic device. Further for explanatory purposes, the operations of the process 600 are described herein as occurring in serial, or linearly. However, multiple operations of the process 600 may occur in parallel. In addition, the operations of the process 600 need not be performed in the order shown and/or one or more of the operations of the process 600 need not be performed and/or can be replaced by other operations.

The process 600 begins after the electronic device 102A has established the other device, e.g. the electronic device 102B, as a trusted device, such as via the example process described above with respect to FIG. 5. The electronic device 102A may then receive a request to allow the other device to access the secure device 104A and/or another secure device associated with the electronic device 102A (602). The electronic device 102A responsively requests the public key of the other device, e.g. the electronic device 102B (604). The electronic device 102A receives the public key from the other device and verifies that the public key is stored in a secure memory region of the electronic device 102A in association with an identifier of the other device, such as a user identifier of the user associated with the other device (606).

If the public key is stored in a secure memory region of the electronic device 102A in association with an identifier associated with the other device (606), the electronic device 102A generates an attestation data item that is signed using a private key of the electronic device 102A and includes the public key of the other device as well as an indication of one or more access rights with respect to the secure device 104A that are assigned to the public key (608). The electronic device 102A then provides (e.g., transmits) the signed attestation item to the other device (610).

Figure 7:
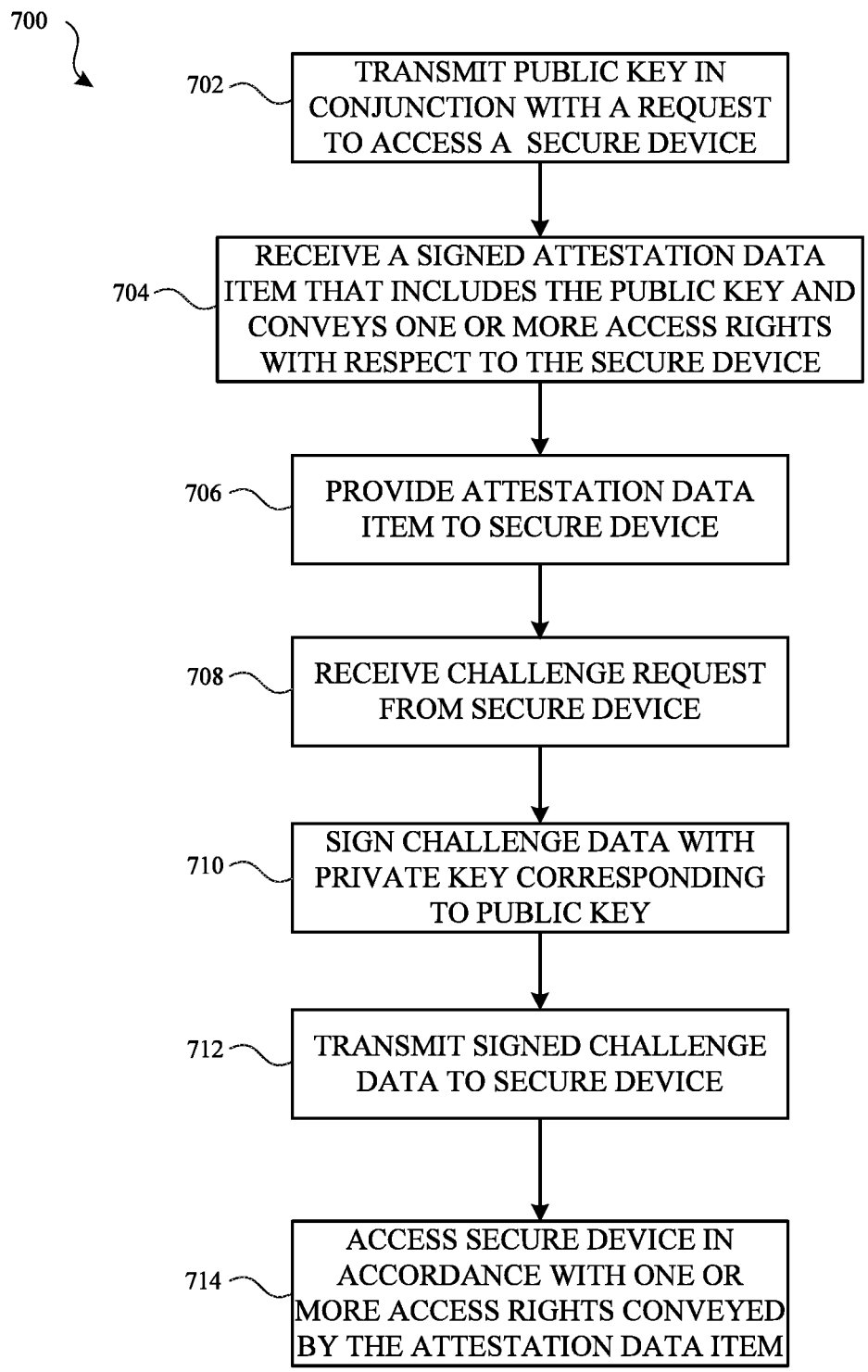
FIG. 7 illustrates a flow diagram of an example process of receiving and using access rights conveyed by an established trusted device in accordance with some implementations.

FIG. 7 illustrates a flow diagram of an example process 700 of receiving and using access rights conveyed by an established trusted device in accordance with one or more implementations. For explanatory purposes, the process 700 is primarily described herein with reference to the electronic device 102B of FIGS. 1-2. However, the electronic device 102B is presented as an exemplary device and the operations described herein may be performed by any suitable device. For example, the process 700 may be performed by one or more of the electronic devices 102A,C, or generally any electronic device. Further for explanatory purposes, the operations of the process 700 are described herein as occurring in serial, or linearly. However, multiple operations of the process 700 may occur in parallel. In addition, the operations of the process 700 need not be performed in the order shown and/or one or more of the operations of the process 700 need not be performed and/or can be replaced by other operations.

The process 700 begins after the electronic device 102A has established the electronic device 102B, as a trusted device, such as via the example process described above with respect to FIG. 5. The electronic device 102B transmits its public key to the electronic device 102A in conjunction with a request to access a secure device, such as the secure device 104A (702). The electronic device 102B receives a signed attestation data item from the electronic device 102A (e.g., signed by a private key of the electronic device 102A) that includes the public key of the electronic device 102B and conveys one or more access rights with respect to the secure device 104A (704).

The electronic device 102B provides the attestation data item to the secure device 104A (706), such as in conjunction with a request to access the secure device 104A. The electronic device 102B receives a challenge request from the secure device 104A, wherein the challenge request includes a challenge data item, such as a nonce (708). The electronic device 102B signs the challenge data item with its private key that corresponds to the public key included in the attestation data item (710), and transmits the signed challenge data item to the secure device 104A (712).

The secure device 104A can use the public key contained in the attestation data item to verify that the challenge data item was signed using the corresponding private key, thereby verifying that the electronic device 102B is authorized to access the secure device 104A. The secure device 104A may also use the public key corresponding to the electronic device 102A to verify that the attestation data item was signed by the private key of the electronic device 102A. Upon verifying that the attestation data item was signed by the private key of the electronic device 102A and that the public key contained in the attestation data item corresponds to the electronic device 102B, the secure device 104A allows access to the electronic device 102B in accordance with the one or more access rights included in the attestation data item. Thus, the electronic device 102B accesses the secure device 104A in accordance with the one or more access rights conveyed by the attestation data item (714).

Figure 8:
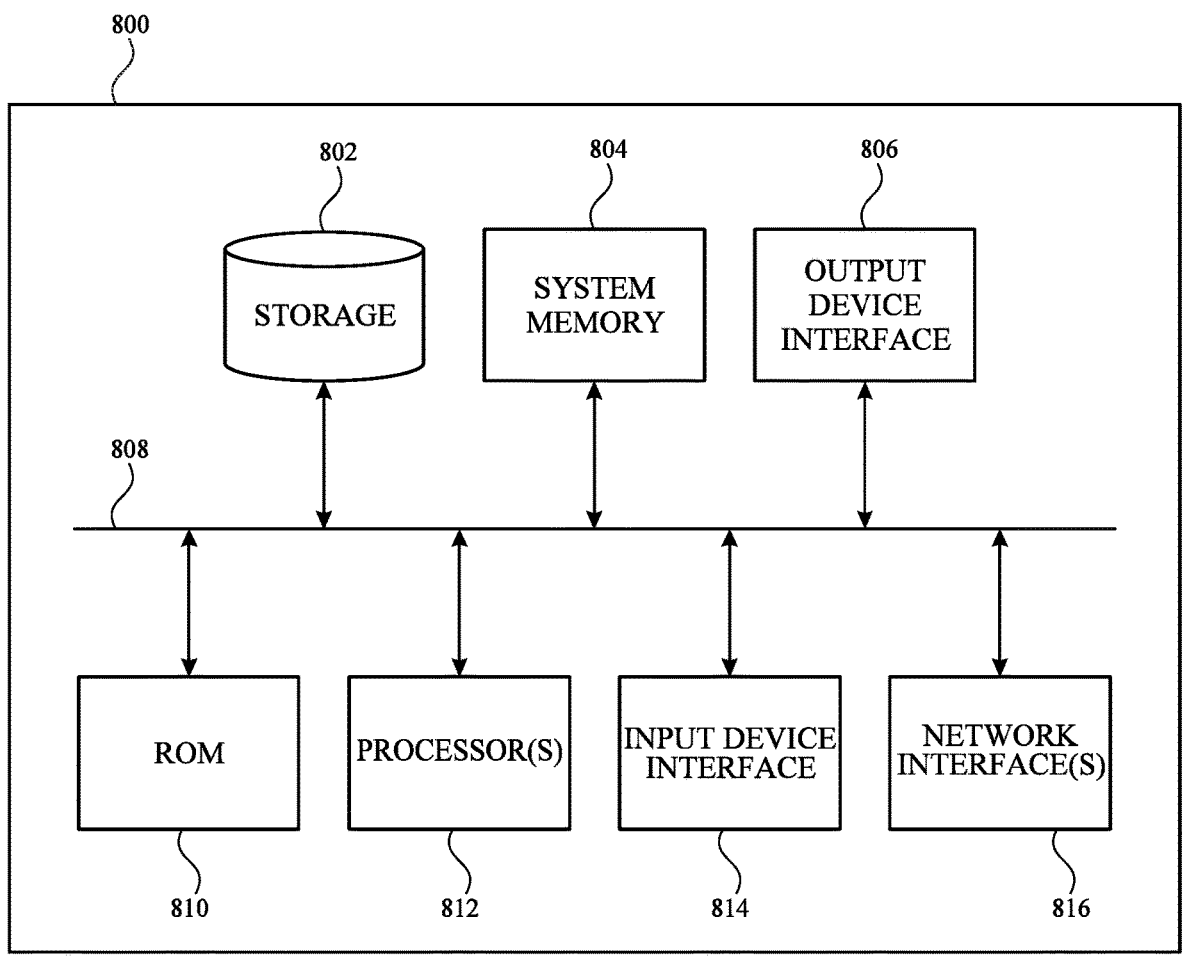
FIG. 8 illustrates an example electronic system with which aspects of the subject technology may be implemented in accordance with some implementations.

FIG. 8 illustrates an example electronic system 800 with which aspects of the subject technology may be implemented in accordance with one or more implementations. The electronic system 800 can be, and/or can be a part of, one or more of the electronic devices 102A-C, one or more of the secure devices 104A-B, and/or one or more of the service provider servers 120 shown in FIG. 1. The electronic system 800 may include various types of computer readable media and interfaces for various other types of computer readable media. The electronic system 800 includes a bus 808, one or more processing unit(s) 812, a system memory 804 (and/or buffer), a ROM 810, a permanent storage device 802, an input device interface 814, an output device interface 806, and one or more network interfaces 816, or subsets and variations thereof.

The bus 808 collectively represents all system, peripheral, and chipset buses that communicatively connect the numerous internal devices of the electronic system 800. In one or more implementations, the bus 808 communicatively connects the one or more processing unit(s) 812 with the ROM 810, the system memory 804, and the permanent storage device 802. From these various memory units, the one or more processing unit(s) 812 retrieves instructions to execute and data to process in order to execute the processes of the subject disclosure. The one or more processing unit(s) 812 can be a single processor or a multi-core processor in different implementations.

The ROM 810 stores static data and instructions that are needed by the one or more processing unit(s) 812 and other modules of the electronic system 800. The permanent storage device 802, on the other hand, may be a read-and-write memory device. The permanent storage device 802 may be a non-volatile memory unit that stores instructions and data even when the electronic system 800 is off. In one or more implementations, a mass-storage device (such as a magnetic or optical disk and its corresponding disk drive) may be used as the permanent storage device 802.

In one or more implementations, a removable storage device (such as a floppy disk, flash drive, and its corresponding disk drive) may be used as the permanent storage device 802. Like the permanent storage device 802, the system memory 804 may be a read-and-write memory device. However, unlike the permanent storage device 802, the system memory 804 may be a volatile read-and-write memory, such as random access memory. The system memory 804 may store any of the instructions and data that one or more processing unit(s) 812 may need at runtime. In one or more implementations, the processes of the subject disclosure are stored in the system memory 804, the permanent storage device 802, and/or the ROM 810. From these various memory units, the one or more processing unit(s) 812 retrieves instructions to execute and data to process in order to execute the processes of one or more implementations.

The bus 808 also connects to the input and output device interfaces 814 and 806. The input device interface 814 enables a user to communicate information and select commands to the electronic system 800. Input devices that may be used with the input device interface 814 may include, for example, alphanumeric keyboards and pointing devices (also called "cursor control devices"). The output device interface 806 may enable, for example, the display of images generated by electronic system 800. Output devices that may be used with the output device interface 806 may include, for example, printers and display devices, such as a liquid crystal display (LCD), a light emitting diode (LED) display, an organic light emitting diode (OLED) display, a flexible display, a flat panel display, a solid state display, a projector, or any other device for outputting information. One or more implementations may include devices that function as both input and output devices, such as a touchscreen. In these implementations, feedback provided to the user can be any form of sensory feedback, such as visual feedback, auditory feedback, or tactile feedback; and input from the user can be received in any form, including acoustic, speech, or tactile input.

Finally, as shown in FIG. 8, the bus 808 also couples the electronic system 800 to one or more networks and/or to one or more network nodes, such as the electronic devices 102A-F shown in FIG. 1, through the one or more network interface(s) 816. In this manner, the electronic system 800 can be a part of a network of computers (such as a LAN, a wide area network ("WAN"), or an Intranet, or a network of networks, such as the Internet. Any or all components of the electronic system 800 can be used in conjunction with the subject disclosure.

As described above, aspects of the present technology may include the gathering and use of data available from various sources to improve the delivery to users of invitational content or any other content that may be of interest to them. The present disclosure contemplates that in some instances, this gathered data may include personal information data that uniquely identifies or can be used to contact or locate a specific person. Such personal information data can include financial data, demographic data, location-based data, telephone numbers, email addresses, twitter ID's, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to deliver targeted content that is of greater interest to the user. Accordingly, use of such personal information data enables users to calculated control of the delivered content. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of, or access to, certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of advertisement delivery services, the present technology can be configured to allow users to select to "opt in" or "opt out" of participation in the collection of personal information data during registration for services or anytime thereafter. In another example, users can select not to provide mood-associated data for targeted content delivery services. In yet another example, users can select to limit the length of time mood-associated data is maintained or entirely prohibit the development of a baseline mood profile. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information available to the content delivery services, or publicly available information.

Implementations within the scope of the present disclosure can be partially or entirely realized using a tangible computer-readable storage medium (or multiple tangible computer-readable storage media of one or more types) encoding one or more instructions. The tangible computer-readable storage medium also can be non-transitory in nature.

The computer-readable storage medium can be any storage medium that can be read, written, or otherwise accessed by a general purpose or special purpose computing device, including any processing electronics and/or processing circuitry capable of executing instructions. For example, without limitation, the computer-readable medium can include any volatile semiconductor memory, such as RAM, DRAM, SRAM, T-RAM, Z-RAM, and TTRAM.

The computer-readable medium also can include any non-volatile semiconductor memory, such as ROM, PROM, EPROM, EEPROM, NVRAM, flash, nvSRAM, FeRAM, FeTRAM, MRAM, PRAM, CBRAM, SONOS, RRAM, NRAM, racetrack memory, FJG, and Millipede memory.

Further, the computer-readable storage medium can include any non-semiconductor memory, such as optical disk storage, magnetic disk storage, magnetic tape, other magnetic storage devices, or any other medium capable of storing one or more instructions. In one or more implementations, the tangible computer-readable storage medium can be directly coupled to a computing device, while in other implementations, the tangible computer-readable storage medium can be indirectly coupled to a computing device, e.g., via one or more wired connections, one or more wireless connections, or any combination thereof.

Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. As recognized by those of skill in the art, details including, but not limited to, the number, structure, sequence, and organization of instructions can vary significantly without varying the underlying logic, function, processing, and output.

While the above discussion primarily refers to microprocessor or multi-core processors that execute software, one or more implementations are performed by one or more integrated circuits, such as ASICs or FPGAs. In one or more implementations, such integrated circuits execute instructions that are stored on the circuit itself.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Any of the blocks may be performed simultaneously. In one or more implementations, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

As used in this specification and any claims of this application, the terms "base station", "receiver", "computer", "server", "processor", and "memory" all refer to electronic or other technological devices. These terms exclude people or groups of people. For the purposes of the specification, the terms "display" or "displaying" means displaying on an electronic device.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The predicate words "configured to", "operable to", and "programmed to" do not imply any particular tangible or intangible modification of a subject, but, rather, are intended to be used interchangeably. In one or more implementations, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

The word "exemplary" is used herein to mean "serving as an example, instance, or illustration". Any embodiment described herein as "exemplary" or as an "example" is not necessarily to be construed as preferred or advantageous over other embodiments. Furthermore, to the extent that the term "include", "have", or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for".

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more". Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. A device comprising:
   a memory; and
   at least one processor configured to:
      receive, via a direct wireless connection and from an other device, a public key associated with the other device and an indication of a data item previously provided to the other device via an out-of-band channel;
      verify that the indication of the data item corresponds to the data item previously provided to the other device via the out-of-band channel;
      store, in a secure memory region, the public key in association with an identifier corresponding to the other device when the indication of the data item is verified based at least on the data item; and
      authorize the public key to access a secure device based at least in part on the public key being stored in the secure memory region, the secure device being separate from the device and the other device.

2. The device of claim 1, wherein the at least one processor comprises at least one of a secure element or a secure enclave processor, and the secure memory region resides in the at least one of the secure element or the secure enclave processor.

3. The device of claim 2, wherein the device further comprises a wireless interface that is securely communicatively coupled to the at least one of the secure element or the secure enclave processor, the wireless interface being configured to establish the direct wireless connection with the other device.

4. The device of claim 3, wherein the device further comprises a host processor and the secure communicative coupling between the wireless interface and the at least one of the secure element or the secure enclave processor bypasses the host processor.

5. The device of claim 1, wherein the identifier corresponding to the other device comprises a user account identifier associated with a user account.

6. The device of claim 5, wherein the at least one processor is further configured to:
   receive a request to allow the other device associated with the user account to access the secure device;
   transmit, to the other device, a request for the public key;
   receive, in response to the request and from the other device, the public key;
   verify that the public key is stored in the secure memory region in association with the identifier of the user account;
   responsive to verifying that the public key is stored in the secure memory region, sign, via a private key of the device, an attestation data item that comprises the public key and an indication of at least one access right assigned to the public key; and
   transmit, to the other device, the attestation data item.

7. The device of claim 6, wherein the other device is configured to access the secure device via the attestation data item.

8. The device of claim 1, wherein the out-of-band channel comprises a non-radio frequency channel.

9. The device of claim 1, wherein the indication of the data item comprises at least one of a copy of the data item or a representation of the data item.

10. The device of claim 1, wherein the data item comprises at least one of an image or an alphanumeric string.

11. The device of claim 1, wherein the direct wireless connection comprises a peer-to-peer wireless connection and the secure device comprises an electronic access control device.

12. The device of claim 1, wherein the secure device comprises a vehicle.

13. A method comprising:
   providing, by a device and via a direct wireless connection with an other device, a public key associated with the device and an indication of a data item previously provided to the device via an out-of-band channel;
   transmitting to the other device, subsequent to the providing, a request to access a secure device, the request comprising the public key, the secure device being separate from the device and the other device;
   receiving, from the other device, an attestation data item signed by a private key of the other device, the attestation data item comprising the public key of the device and an indication of one or more access rights assigned to the public key by the other device, the one or more access rights corresponding to the secure device;
   providing the attestation data item to the secure device; and
   accessing the secure device in accordance with the one or more access rights assigned to the public key.

14. The method of claim 13, further comprising:
   receiving, from the secure device, a request to verify the public key;
   signing an other data item using an other private key corresponding to the public key; and
   transmitting the signed other data item to the secure device.

15. The method of claim 13, wherein the out-of-band channel comprises a non-radio frequency channel.

16. The method of claim 13, wherein the secure device comprises at least one of an electronic access control device or a vehicle.

17. A system comprising:
   a first device comprising at least one first processor configured to:
      establish a trust relationship with a second device via a direct wireless connection;
      store, in a secure memory region and in conjunction with establishing the trust relationship with the second device, a public key of the second device in association with an identifier corresponding to the second device, the public key being received from the second device over the direct wireless connection; and
      transmit an attestation data item to the second device based at least in part on the public key being stored in the secure memory region, the attestation data item being signed by a private key of the first device and conveying one or more access rights assigned to the public key of the second device, the one or more access rights corresponding to a secure device;
   the second device comprising at least one second processor configured to:
      establish the trust relationship with the first device and transmit, via the direct wireless connection, the public key to the first device;
      receive the attestation data item from the second device;
      provide the attestation data item to the secure device; and access the secure device in accordance with the one or more access rights assigned by the first device to the public key of the second device; and the secure device comprising at least one third processor configured to:

receive, from the second device, the attestation data item;

verify that the attestation data item was signed by the private key of the first device and that the public key contained in the attestation data item corresponds to the public key of the second device; and provide access to the second device in accordance with the one or more access rights when the attestation data item is verified as having been signed by the private key of the first device and the public key contained in the attestation data item is verified as corresponding to the public key of the second device.

18. The system of claim 17, wherein the direct wireless connection comprises a short range radio connection.

19. The system of claim 17, wherein the at least one third processor of the secure device is further configured to:

pair with the first device; and provide the private key to the first device in conjunction with the pairing.

20. The system of claim 17, wherein the secure device comprises at least one of an electronic access control device or a vehicle.

* * * * *